(12) United States Patent  
Sarver et al.

(10) Patent No.: US 9,234,712 B2  
(45) Date of Patent: Jan. 12, 2016

(54) SELF-ALIGNING PLUG FOR POSITIONING A TEMPERATURE SENSOR WITHIN A TRANSFORMER WINDING

(75) Inventors: Charlie Sarver, Rocky Gap, VA (US); William E. Pauley, Jr., Bland, VA (US); Barry Dean Havens, Bland, VA (US); Christopher Lee Adams, Princeton, WV (US); Dan William Benedict, Christiansburg, VA (US)

(73) Assignee: ABB Inc., Cary, NC (US)

(*) Notice: Subject to any disclaimer, the term of this patent is extended or adjusted under 35 U.S.C. 154(b) by 712 days.

(21) Appl. No.: 13/562,363

(22) Filed: Jul. 31, 2012

(65) Prior Publication Data

US 2014/0034286 A1 Feb. 6, 2014

(51) Int. Cl.
*G01K 1/00* (2006.01)
*F28F 27/00* (2006.01)
*H01F 41/00* (2006.01)
*G01K 1/14* (2006.01)
*H01F 27/40* (2006.01)

(52) U.S. Cl.
CPC . *F28F 27/00* (2013.01); *G01K 1/14* (2013.01); *H01F 41/00* (2013.01); *H01F 2027/406* (2013.01); *Y10T 29/4902* (2015.01); *Y10T 403/635* (2015.01)

(58) Field of Classification Search
USPC ................... 374/152, 208; 73/866.5
See application file for complete search history.

(56) References Cited

U.S. PATENT DOCUMENTS

| 2,066,419 | A | * | 1/1937 | Pfistershammer | 52/843 |
|---|---|---|---|---|---|
| 2,761,101 | A | * | 8/1956 | Gugliehno Camilli et al. | 361/37 |
| 3,371,298 | A | * | 2/1968 | Narbut | 336/57 |
| 5,022,766 | A | * | 6/1991 | Phipps | 374/209 |
| 6,086,249 | A | * | 7/2000 | Urich | 374/152 |
| 6,851,850 | B1 | * | 2/2005 | Lee | G01K 1/083 374/163 |
| 7,161,454 | B2 | | 1/2007 | LaBoube et al. | |
| 7,377,689 | B2 | * | 5/2008 | Balan | 374/152 |
| 7,793,559 | B2 | * | 9/2010 | Susfalk et al. | 73/866.5 |
| 8,416,042 | B2 | * | 4/2013 | Schwaiger | 336/60 |
| 2002/0136263 | A1 | * | 9/2002 | Wilkins | 374/141 |
| 2003/0120393 | A1 | * | 6/2003 | Bailey et al. | 700/284 |

* cited by examiner

*Primary Examiner* — Lisa Caputo
*Assistant Examiner* — Nasir U Ahmed
(74) *Attorney, Agent, or Firm* — Melissa J. Szezepanik

(57) ABSTRACT

A plug for ease of alignment of a temperature probe or sensor inside a duct of a transformer winding is provided. The plug is shaped for secure placement into a duct or passage of a transformer winding without requiring any adhering material. The insertion of the plug into the duct or passage brings the temperature probe into contact with the desired point along the transformer winding being thermally monitored.

6 Claims, 3 Drawing Sheets

SELF-ALIGNING PLUG FOR POSITIONING A TEMPERATURE SENSOR WITHIN A TRANSFORMER WINDING

FIELD OF INVENTION

The present application is directed to a plug for aligning a temperature sensor within a transformer coil winding.

BACKGROUND

Transformers generate significant heat during operation. The temperature of the transformer windings may be monitored to control the operation of the transformer within a certain temperature range, as high operating temperatures are known to cause fault conditions in transformers. Temperature probes are typically used to monitor the temperature of transformer coil windings along predetermined points on the coil windings. Known methods of placing temperature probes within coil windings involve gluing or otherwise adhering the probes to the desired position along the coil winding to be monitored.

SUMMARY

A plug for aligning a temperature tube in a transformer winding has a body having generally elliptical first and second end portions, respectively. The first end portion has a larger diameter than the second end portion and the first end portion gradually tapers over the length of the body to the second end portion. The body has a through-hole disposed therein and the through-hole extends from the first end portion to the second end portion. The body is adapted to engage with a temperature probe having a generally cylindrical shape.

A method of positioning a temperature probe within a transformer winding, comprising:
 a. providing a plug having first and second ends, the second end having an outer diameter smaller than an outer diameter of the first end;
 b. inserting a temperature probe into a through-hole of the plug so that the probe extends through and partially outside of the plug first and second ends; and
 c. inserting the second end of the plug into a duct or passage of a transformer winding so that the temperature probe contacts the portion of the transformer winding to be monitored.

A method for cooling a transformer, comprising:
 a. providing a temperature probe and plug;
 b. inserting said temperature probe into said plug so that said probe extends through and partially outside of said plug;
 c. inserting said plug into a duct or passage of a transformer winding so that said temperature probe contacts the portion of the transformer winding to be monitored;
 d. electrically connecting said temperature probe to a voltage measuring device;
 e. electrically connecting said voltage-measuring device to a temperature monitor; and
 f. programming said temperature monitor so that fans are activated when a predetermined temperature threshold is reached.

BRIEF DESCRIPTION OF THE DRAWINGS

In the accompanying drawings, structural embodiments are illustrated that, together with the detailed description provided below, describe exemplary embodiments of a self-aligning temperature plug for a dry-type transformer. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
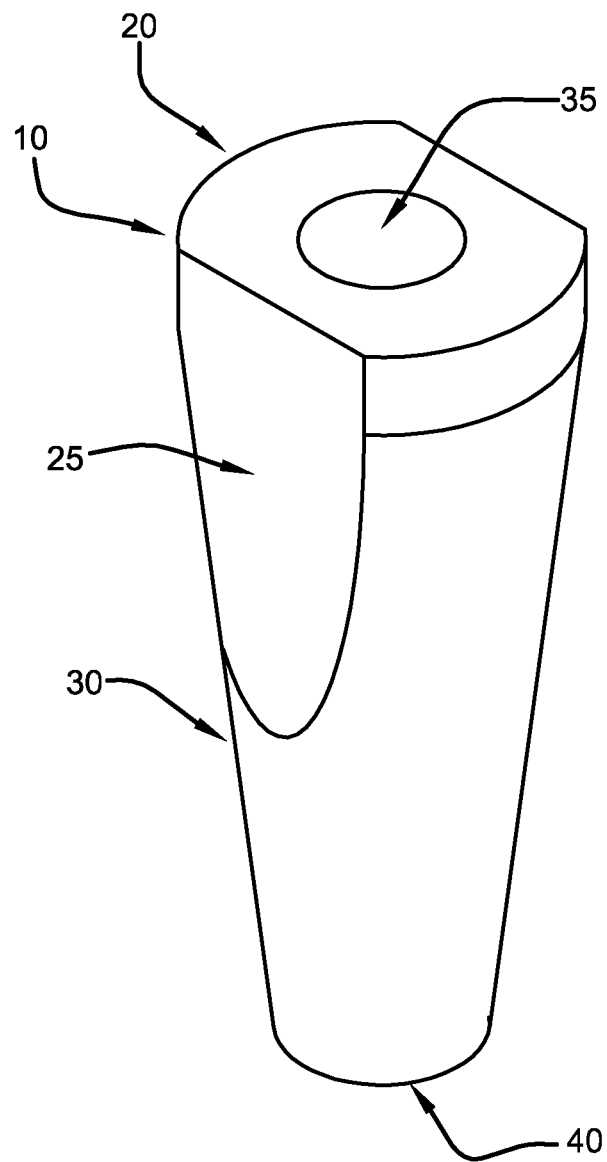
FIG. 1 is an isometric view of a self-aligning temperature plug embodied in accordance with the present invention.
Figure 2:
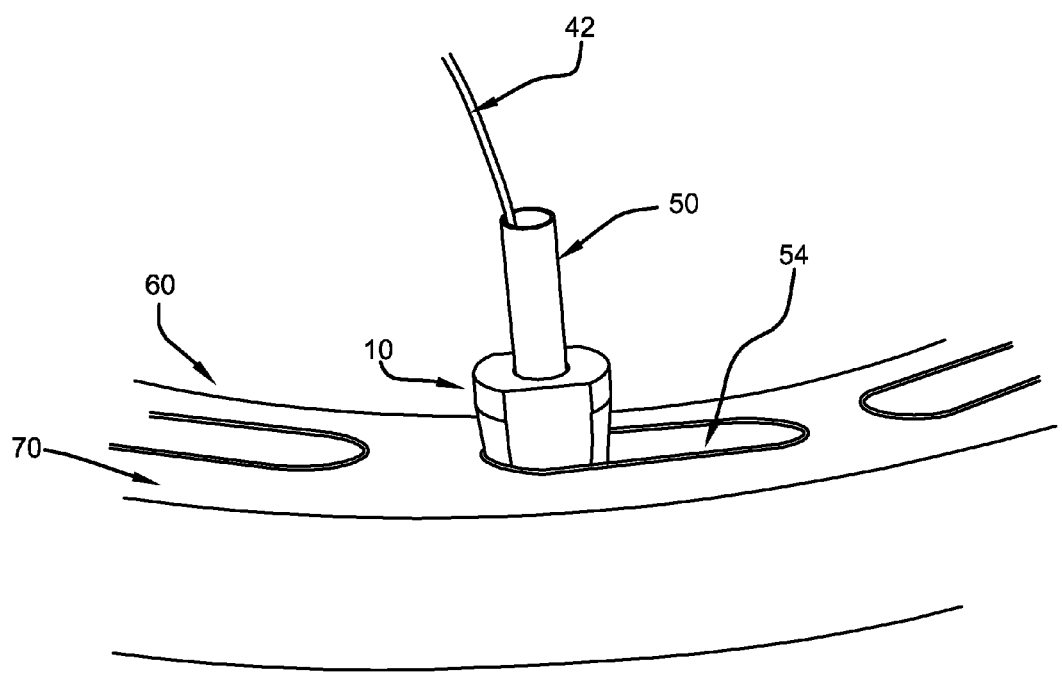
FIG. 2 is perspective view of the temperature plug inserted within a duct of a vacuum cast transformer coil winding.

A plug 10 for aligning a temperature sensor in a coil winding 70 of a dry-type transformer is depicted in FIG. 1. The plug 10 may be used with a vacuum-cast coil, open wound coil or any other type of coil winding 70 suitable for the application. The plug 10 is formed from a room temperature vulcanizing (RTV) silicone rubber material and is adapted to receive a temperature tube 50 or probe as shown in FIG. 2. An exemplary RTV silicone rubber material utilized in forming the plug 10 is Silastic® RTV silicone rubber base used in conjunction with a Silastic® M-3 silicone rubber curing agent, available from Dow Corning Corporation of Midland, Mich. A finished plug 10 formed from the RTV silicone rubber material has a temperature withstand of 220 degrees Celsius during the operation of the transformer.

The plug 10 is formed by pouring the RTV silicone rubber material into a two-piece mold having the desired shape to form the plug 10. The curing agent is added and the RTV silicone rubber material is cured at room temperature for about four to about 24 hours. Alternatively, the mold containing the silicone rubber material and curing agent may be baked in an oven for about an hour at 100 degrees Celsius to hasten the curing process.

The plug 10 has a body 30 and generally elliptical first and second end portions 20, 40. The first end portion 20 has opposing sides upon which a flat portion 25 is disposed. The flat portion 25 begins at a top surface of the first end portion 20 and extends about 1.5 inches or about halfway along the body 30 of the plug 10.

The plug 10 is tapered from the first end portion 20 having an outer diameter of about 1.063 inches to the second end portion having an outer diameter of about 0.75 inches. A through-hole 35 extends through the body 30 from the first end portion 20 to the second end portion 40 of the plug 10. The temperature tube 50, when fully inserted in the plug 10, extends completely through the through-hole 35. The tube 50 also extends beyond the plug 10 first and second end portions 40. The temperature tube 50 is formed from polytetrafluoroethylene, such as is sold under the trademark Teflon®.

The plug 10 is adapted for insertion in a duct 54 or passage between windings or layers of windings formed from copper or aluminum sheet, wire, strips, or foils in a transformer coil 70. The plug 10 may be inserted lengthwise or widthwise depending on the size and configuration of the duct 54 or passage 66. The plug 10 is inserted in generally oblong duct 54 formed of a glass fiber-reinforced plastic (GFRP) tube or a passage 66 formed by one or more spacers 62, the spacers 62 comprising long rods typically formed in a rod, dog-bone shape, or elliptical shape. In one embodiment, the ducts 54 and spacers are formed from a pultruded GFRP.

The method for installing the plug 10 in a transformer coil winding 70 includes inserting the temperature tube into the through-hole 35 of the plug 10 so that a predetermined length of the temperature tube 50 is in contact with the portion of the transformer winding being measured. The temperature tube 50 is fully engaged with the plug 10 when the temperature tube 50 is passed through the through-hole 35 beginning at the first end portion 20 of the plug 10, the tube 50 extends through the through-hole 35 completely, and when a majority of the temperature tube 50 extends outside of the second end portion 40 of the plug 10. Installing the plug 10 in a transformer winding 70 involves placing the plug 10 into the duct 54, passage 66, or in between windings or layers of windings by hand or by using a tool, if necessary, to apply pressure to the first end portion 20 of the plug 10 and thereby seat the plug 10 within the duct 54, passage 66, or windings.

Referring now to a low voltage coil 60 depicted in FIG. 2, the plug 10 having the temperature tube 50 fully seated in the through-hole 35, is wedged into the duct 54 by hand, and may further be turned 90 degrees with respect to a horizontal axis of the duct 54 and depending on the configuration of the duct 54. As the plug 10 is wedged into the duct 54 or passage, the tube 50 is brought into contact with the desired point for temperature measurement along the transformer winding 70.

The insertion depth of the plug 10 is about 3 to 4 inches below a top, outer surface 60 of the transformer winding 70. The insertion depth of the temperature tube 50 once inserted into the plug 10 is from about 6 inches to about 7 inches as measured from a top, outer surface of the transformer winding 70. It should be understood that the insertion depth for the plug 10 and temperature tube 50 may vary depending on the application, size of the coils, transformer output rating and desired measurement point along the length of the coil.

Figure 3:
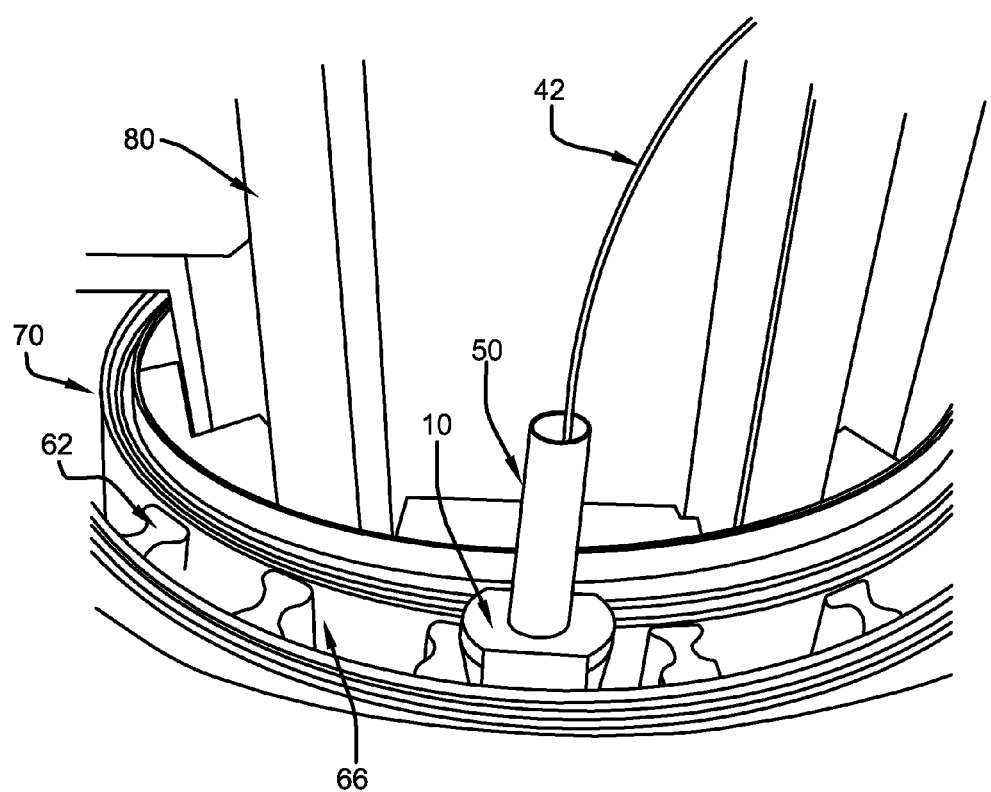
FIG. 3 is a perspective view of the temperature plug inserted within a passage formed by at least one spacer in an open wound transformer coil winding.

Referring now to FIG. 3, a transformer core 80 surrounded by low voltage coil 70 is depicted having passages 66 formed by the at least one spacer 62. In the same manner of installation as with the duct 54 installation, the plug 10 is wedged into the passage 66 by hand and may further be turned 90 degrees with respect to a horizontal axis of the passage and depending on the configuration of the passage 66. The tapered contour of the plug 10 along the length of the plug 10 retains the plug in a snug fit inside a transformer coil winding 70, duct 54, or passage 66.

The plug 10 is typically used in a low voltage coil winding 70, however, in certain embodiments the plug 10 is used with a high voltage coil winding. The high voltage coil winding may be concentrically mounted to, disposed around or otherwise surround the low voltage coil winding 70. Alternatively, the high voltage coil winding may be located inside the low voltage coil winding 70 depending upon the transformer design and application.

A cooling system for the transformer utilizes the plug 10 and temperature probe 50. The plug 10 has the temperature probe 50 inserted inside the plug 10. The temperature probe 50 is further attached or electrically connected 42 to a voltage measuring device, such as a thermocouple. The voltage measuring device is further electrically connected to a temperature monitor. The voltage measuring device measures the voltage present in the desired location of the coil winding 70, duct 54, or passage 66. The voltage measurement or reading is converted by the temperature monitor and used to cycle fans on and off that cool the transformer to a preset temperature or temperature range. Alternatively, fans may be activated when the temperature measurement or reading at a predetermined location along the transformer winding reaches or exceeds a temperature setting or threshold in the temperature monitor.

The fans may be positioned at each phase of the transformer, below an outer surface at the bottom of each coil winding 70, or above an outer surface at the top of each coil winding 70. When the fans are positioned above each coil winding, the air is directed downward through into each coil winding 70. When the fans are positioned below each coil winding 70, the air generated by the fans is directed upward into each coil winding 70. Alternatively, a transformer having a triangular-shaped core may have a single fan directed above or below one of the vertices of the triangular-shaped core, or a fan directing air into one of the vertices of the core from below or above the triangular-shaped core.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A plug for aligning a temperature tube probe in a transformer winding, comprising: a body having an exterior elliptical first end portion and a round second end portion and a through-hole extending from said first to said second end portions for seating said temperature probe, said body elliptical first end portion having a larger diameter than said body round second end portion, said body tapering over a length extending from said elliptical first to said round second end portions; and wherein said temperature probe extends through said plug round second end and contacts a portion of said transformer winding.

2. The plug of claim 1 wherein said temperature probe has first and second ends and said second end is located at a depth of at least 6 inches from a top surface of said transformer winding.

3. The plug of claim 1 wherein said plug is seated in a duct of a transformer winding.

4. The plug of claim 1 wherein said plug is seated in a passage formed by at least one spacer in a transformer winding.

5. The plug of claim 1, wherein said plug is formed of a room temperature vulcanizing silicone rubber.

6. The plug of claim 1, wherein said plug is seated between adjacent layers of transformer coil windings.

* * * * *